US012118660B2

(12) United States Patent
Wu et al.

(10) Patent No.: US 12,118,660 B2
(45) Date of Patent: Oct. 15, 2024

(54) METHOD, SYSTEM, AND DEVICE FOR COLORING PIXEL IN THREE-DIMENSIONAL VIRTUAL SPACE, AND MEDIUM

(71) Applicant: Shanghai Lilith Technology Corporation, Shanghai (CN)

(72) Inventors: Di Wu, Shanghai (CN); Yinpeng Wang, Shanghai (CN)

(73) Assignee: Shanghai Lilith Technology Corporation, Shanghai (CN)

( * ) Notice: Subject to any disclaimer, the term of this patent is extended or adjusted under 35 U.S.C. 154(b) by 0 days.

(21) Appl. No.: 17/773,436

(22) PCT Filed: May 31, 2021

(86) PCT No.: PCT/CN2021/097215
§ 371 (c)(1),
(2) Date: Apr. 29, 2022

(87) PCT Pub. No.: WO2022/105182
PCT Pub. Date: May 27, 2022

(65) Prior Publication Data
US 2024/0177410 A1 May 30, 2024

(30) Foreign Application Priority Data
Nov. 23, 2020 (CN) .......................... 202011319369.0

(51) Int. Cl.
*G06T 15/55* (2011.01)
*G06T 19/20* (2011.01)
(52) U.S. Cl.
CPC .............. *G06T 15/55* (2013.01); *G06T 19/20* (2013.01)

(58) Field of Classification Search
CPC ......... G06T 15/55; G06T 15/00; G06T 15/04; G06T 15/10; G06T 15/80; G06T 19/00; G06T 19/20; G06T 2219/00; G06T 2219/2012
See application file for complete search history.

(56) References Cited

FOREIGN PATENT DOCUMENTS

CN          110782534 A  *  2/2020  ............. G06T 15/00

OTHER PUBLICATIONS

EPO Machine Translation of CN-110782534-A (Year: 2020).*

* cited by examiner

*Primary Examiner* — King Y Poon
*Assistant Examiner* — Vincent Peren
(74) *Attorney, Agent, or Firm* — David R. Stevens; Stevens Law Group

(57) ABSTRACT

The present invention particularly relates to a method, a system, a device for coloring a pixel in a three-dimensional virtual space, and a medium. A color of a reference is used to color a target pixel, and the method includes: determining a coloring weight of a color of each reference to the colored pixel based on a position of at least one reference in the three-dimensional virtual space and a position of the colored pixel in the three-dimensional virtual space; taking a color of at least one reference as a variable value, and performing weighted summation on the color of at least one reference based on the coloring weight of the color to the colored pixel; and taking a result of weighted summation as a color of the colored pixel.

8 Claims, 4 Drawing Sheets

METHOD, SYSTEM, AND DEVICE FOR COLORING PIXEL IN THREE-DIMENSIONAL VIRTUAL SPACE, AND MEDIUM

TECHNICAL FIELD

The present invention relates to the field of two-dimensional or three-dimensional virtual modeling technologies, and in particular, to a method, a system, a device for coloring a pixel in a three-dimensional virtual space, and a medium.

BACKGROUND

In a two-dimensional virtual plane, gradient color coloring can be performed on an image by drawing a straight line with a mouse, and this method is more intuitive. However, in a three-dimensional virtual space, the above method is relatively abstract, and the generated gradient color cannot be further modified. Therefore, three-dimensional modeling software cannot perform gradient color coloring in the form of selecting a direction with the mouse like plane software.

SUMMARY

An objective of the present invention is to provide a method, a system, and a device for coloring for a pixel in a three-dimensional virtual space, and a medium. A reference is used in the three-dimensional virtual space to complete the coloring of the colored pixel according to a color and a position of the reference and a position of the colored pixel. A principle of gradient color can be easily simulated in a three-dimensional virtual space by creating a reference, and the gradient color can be intuitively and visually presented on the modeled object, or the coloring of pixels in the three-dimensional virtual space can be adjusted by adjusting a position and a color of the reference in the space, and can be conveniently, intuitively and visually adjusted on the basis of the existing coloring result. In the present invention, rich expansibility is also provided, for example, traditional coloring is mostly performed by using two points; however, in this solution, the coloring can be expanded to multi-point and multi-gradient coloring, and advanced coloring requirements can be met for professional users.

An implementation of the present invention discloses a method for coloring a pixel in a three-dimensional virtual space, a color of a reference is used to color the target pixel, and the method includes:

determining a coloring weight of a color of each reference to the colored pixel based on a position of at least one reference in the three-dimensional virtual space and a position of the colored pixel in the three-dimensional virtual space;

performing weighted summation on a color of at least one reference by taking the color of at least one reference as a variable value, and based on a coloring weight of the color to the colored pixel; and taking a result of the weighted summation as a color of the colored pixel.

Optionally, the method further includes:
determining a coloring weight of a color of the $n^{th}$ reference to the colored pixel:

$$\left(1 - \frac{L_n}{\sum_{k=1}^{N} L_k}\right) \frac{1}{N-1},$$

where N represents the number of the references, and $L_n$ represents a distance between the $n^{th}$ reference and the colored pixel.

Optionally, the number of the references is 2, and the method further includes: determining coloring weights of colors of the two references to the colored pixel based on a position of a projection of the colored pixel point on a straight line where the two references are located.

Optionally, the method further includes: if the projection is on a line segment using two references as ending points, determining a coloring weight of a color of any one of the references to the colored pixel to be: a quotient obtained by dividing a distance from the projection to the reference by a distance between the two references.

Optionally, if the projection is outside the line segment using the two references as ending points, a position of the reference closest to the projection is regarded as the position of the projection, and a coloring weight of a color of any one of the references to the colored pixel is determined to be: a quotient obtained by dividing a distance from the projection to the reference by a distance between the two references.

Optionally, a formula of the weighted summation is $\Sigma_{n=1}^{N} W_n C_n$, where N represents the number of the references, $C_n$ represents the color of the $n^{th}$ reference, and $W_n$ represents a coloring weight of $C_n$ to the colored pixel.

An implementation of the present invention discloses a system for coloring a pixel in a three-dimensional virtual space, including:

a weight determining module, configured to determine a coloring weight of a color of each reference to the colored pixel based on a position of at least one reference in the three-dimensional virtual space and a position of the colored pixel in the three-dimensional virtual space;

a summation module, configured to perform weighted summation on a color of at least one reference by taking the color of at least one reference as a variable value, and based on a coloring weight of the color to the colored pixel; and a coloring module, configured to take a result of the weighted summation as a color of the colored pixel.

An implementation of the present invention discloses a device for coloring a pixel in a three-dimensional virtual space, including a memory storing computer-executable instructions and a processor, and the processor is configured to execute the instructions to implement the method for coloring a pixel in a three-dimensional virtual space.

An implementation of the present invention discloses a computer storage medium encoded with a computer program, including instructions, and the instructions are executed by one or more computers to implement the method for coloring a pixel in a three-dimensional virtual space.

Compared with the prior art, main differences and effects of the implementations of the present invention are as follows:

In the present invention, a coloring weight of a color of each reference to a colored pixel is determined based on a position of at least one reference in a three-dimensional virtual space and a position of the colored pixel in the three-dimensional virtual space; weighted summation is performed on a color of at least one reference by taking the color of at least one reference as a variable value, and based on a coloring weight of the color to the colored pixel; a result of the weighted summation is taken as a color of the colored pixel. The method is applied to multiple pixels, a principle of gradient color can be easily simulated in a three-dimensional virtual space by creating a reference, and the gradient color can be intuitively and visually displayed on the modeled object, or the coloring of pixels in the three-dimensional virtual space is adjusted by adjusting a position and a color of the reference in the space, and can be conveniently, intuitively and visually adjusted on the basis of the existing coloring result.

In the present invention, a coloring weight of a color of the $n^{th}$ reference to the colored pixel is determined to be:

$$\left(1 - \frac{L_n}{\sum_{k=1}^{N} L_k}\right) \frac{1}{N-1},$$

where N represents the number of references, and $L_n$ represents a distance between the $n^{th}$ reference and the colored pixel. The meaning of this determining of the coloring weight is that the color closer to the pixel has a higher proportion in the final coloring. The above method is applied to multiple pixels on the virtual model. Because the final coloring is a mixture of multiple colors, the presentation is very close to the superposition effect of multiple light sources in the space, and is closer to the color presentation in real life.

In the present invention, the number of references is 2, and coloring weights of colors of the two references to the colored pixel are determined based on a position of a projection of the colored pixel on a straight line where the two references are located. If the projection is on a line segment using the two references as ending points, a coloring weight of a color of any reference to the colored pixel is determined to be: a quotient obtained by dividing a distance from the projection to the reference by a distance between the two references; if the projection is outside the line segment using the two references as ending points, a position of the reference closest to the projection is regarded as the position of the projection, and a coloring weight of the color of any one of the references to the colored pixel is determined to be: a quotient obtained by dividing a distance from the projection to the reference by a distance between the two references. The above method is applied to multiple pixels on the virtual model. The meaning of the determining of the coloring weight is as follows: The distance between the projection point and the ending point is used as the gradient, and linear and smooth transition between the two colors of the references is performed for the final color of the model, so that the starting point and ending point of coloring can be better reflected.

In the present invention, the coloring weight of color of each reference to the colored pixel is determined based on the position of at least one reference in the three-dimensional virtual space and the position of the colored pixel in the three-dimensional virtual space, and the coloring weight can be flexibly determined. In this way, in the present invention, rich expansibility is provided. For example, traditional coloring is mostly performed by using two points; however, in this solution, the coloring can be extended to multi-point and multi-gradient coloring, and advanced coloring requirements can be met for professional users.

DETAILED DESCRIPTION

Figure 1:
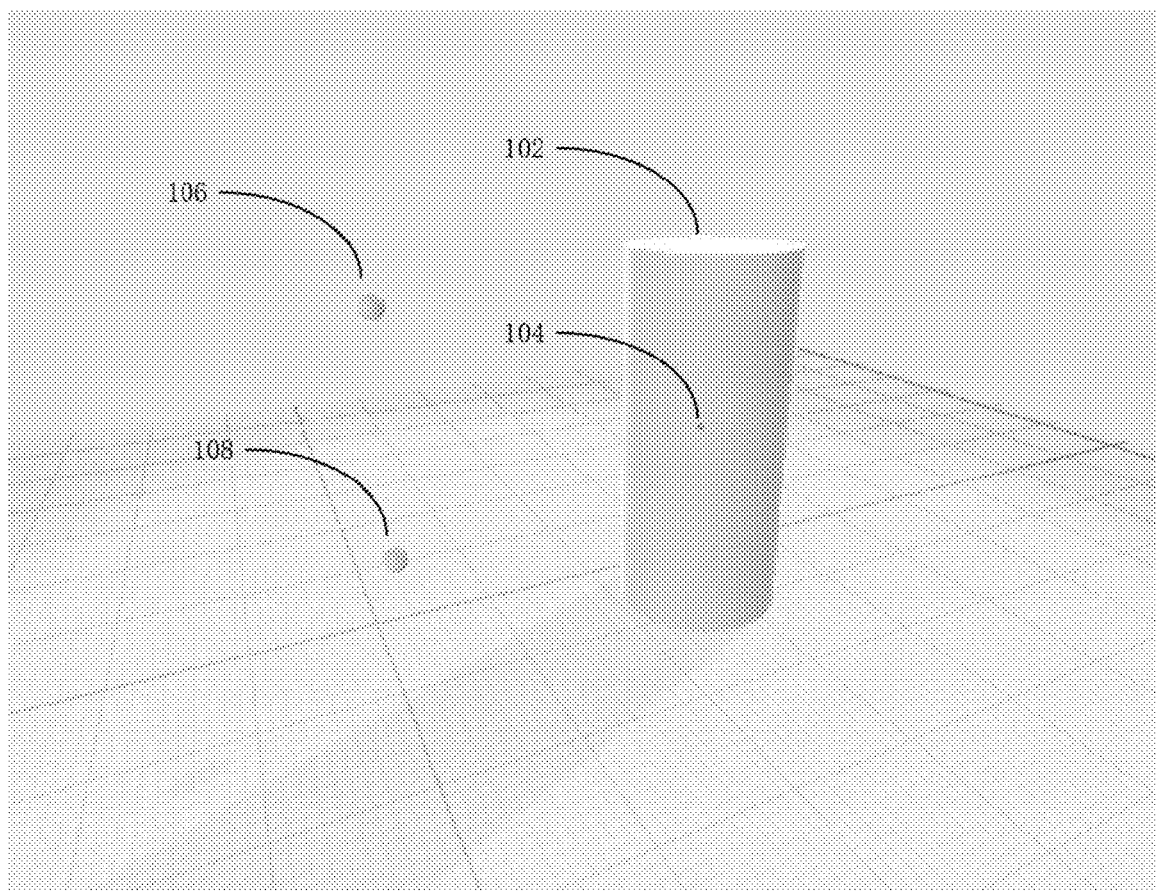
FIG. 1 is a schematic diagram of a model, a pixel on the model, and references in a three-dimensional virtual space according to the present invention.

The present application is further described below with reference to specific embodiments and accompanying drawings. It should be understood that the specific embodiments described herein are only for explaining the present application, rather than limiting the present application. In addition, for the convenience of description, the drawings show only some but not all of the structures or processes related to the present application. It should be noted that in this description, similar numerals and letters indicate similar items in the following drawings.

It should be understood that, although the terms "first," "second," etc. may be used herein to describe various features, these features should not be limited by these terms. These terms are used for distinction only and should not be construed to indicate or imply relative importance. For example, a first feature could be termed a second feature, and, similarly, a second feature could be termed a first feature, without departing from the scope of example embodiments.

In the description of this application, it should further be noted that, unless otherwise expressly specified and limited, the terms "setting", "joint" and "connection" should be understood in a broad sense, for example, the connection may be a fixed connection or a detachable connection, or an integral connection; or may be a mechanical connection or an electrical connection; or may be a direct connection, or an indirect connection through an intermediate medium, or internal communication between two components. For a person of ordinary skill in the art, the specific meanings of the above terms in this embodiment can be understood in specific situations.

Illustrative embodiments of the present application include, but are not limited to, a method, a system, and a device for coloring a pixel in a three-dimensional virtual space, and a medium.

Various aspects of the illustrative embodiments are described by using terms commonly used by persons skilled in the art to convey the substance of their work to others skilled in the art. However, it is apparent to the persons skilled in the art that some alternative embodiments can be implemented by using some of the described features. For purposes of explanation, specific numbers and configurations are set forth in order to provide a more thorough understanding of the illustrative embodiments. However, it is apparent to the person skilled in the art that alternative embodiments may be practiced without the specific details. In some other instances, well-known features are omitted or simplified herein in order to avoid obscuring the illustrative embodiments of the application.

Furthermore, various operations are described as multiple operations separate from each other in a manner that is most helpful in understanding the illustrative embodiments. However, the order of description should not be construed to imply that these operations are necessarily dependent on the order of description, and many of the operations may be performed in parallel, concurrently, or simultaneously. In addition, the order of operations can also be rearranged. The process may be terminated when the described operations are complete, but additional steps not included in the drawings may further be included. The process may correspond to a method, a function, a procedure, a subroutine, a subprogram, and the like.

References to "one embodiment," "an embodiment," "an illustrative embodiment," etc. in the description indicate that the described embodiment may include a particular feature, structure, or property, but each embodiment may or may not include a particular characteristic, structure or property. Moreover, these phrases are not necessarily referring to the same embodiment. Furthermore, when certain features are described with reference to specific embodiments, the knowledge of the persons skilled in the art can influence the combination of those features with other embodiments, regardless of whether or not those embodiments are explicitly described.

Unless otherwise specified in the context, the terms "comprising", "having" and "including" are synonyms. The phrase "A and/or B" indicates "(A), (B) or (A and B)".

As used herein, the term "module" may refer to, as a part of, or include: a memory (shared, dedicated, or group) for running one or more software or firmware programs, an application specific integrated circuit (ASIC), an electronic circuit and/or a processor (shared, dedicated, or group), a combinational logic circuit, and/or another suitable component that provide the described functionality.

In the drawings, some structural or method features may be shown in specific arrangements and/or sequences. It should be understood, however, that such specific arrangement and/or ordering are not necessarily required. Rather, in some embodiments, these features may be described in a manner and/or order different from that shown in the illustrative drawings. Additionally, structural or method features included in a particular figure does not imply that such features need to be included in all embodiments, and in some embodiments such features may not be included or may be combined with other features.

In order to make the objectives, technical solutions and advantages of the present application clearer, the implementations of the present application are further described in detail below with reference to the accompanying drawings.

FIG. 1 is a schematic diagram of a model, a pixel on the model, and references in a three-dimensional virtual space according to an embodiment of the present invention.

As shown in FIG. 1, there is a model 102, a pixel 104 on the model, a reference $B_1$ 106 and a reference $B_2$ 108 in a three-dimensional virtual space.

Figure 2:
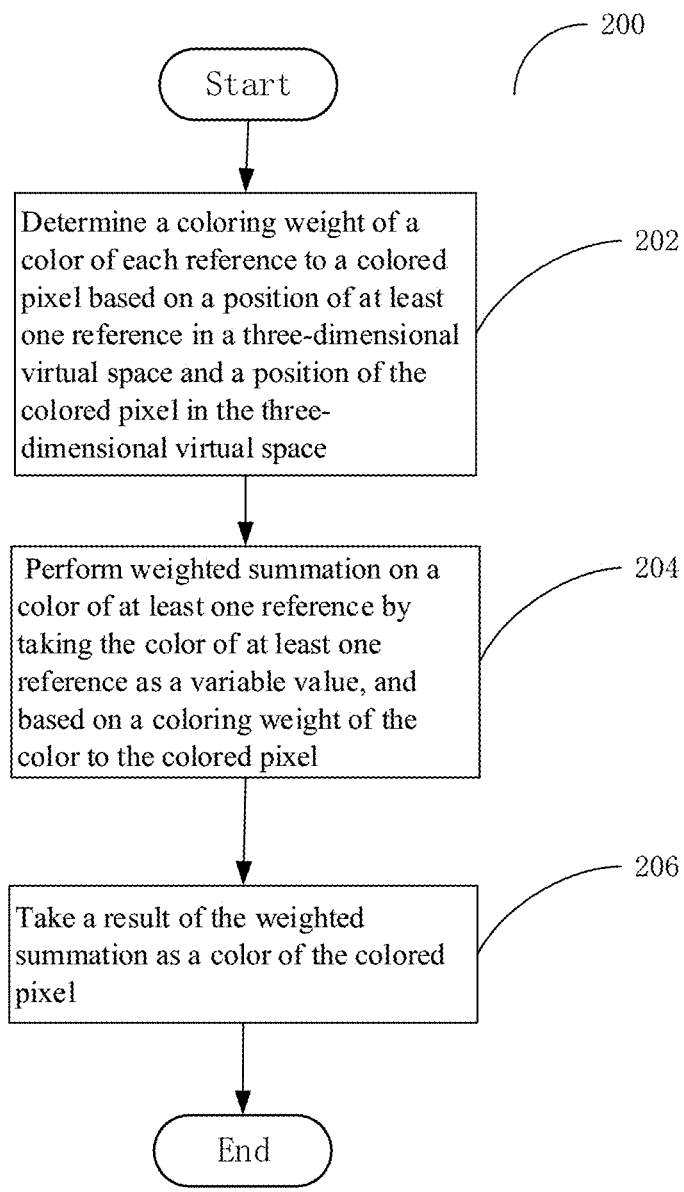
FIG. 2 is a flowchart of a method for coloring a pixel in a three-dimensional virtual space according to the present invention.

FIG. 2 is a flowchart of a method for coloring a pixel in a three-dimensional virtual space according to an embodiment of the present invention.

As shown in FIG. 2, the method 200 includes:

Step 202: Determine a coloring weight of a color of each reference to a colored pixel based on a position of at least one reference in a three-dimensional virtual space and a position of the colored pixel in the three-dimensional virtual space.

Step 204: Perform weighted summation on a color of at least one reference by taking the color of at least one reference as a variable value, and based on a coloring weight of the color to the colored pixel.

Step 206: Take a result of the weighted summation as a color of the colored pixel.

With reference to FIG. 1, for example, when a user wants to color the pixel 104 on the three-dimensional virtual model 102, one or more references are created for the user at specified positions according to coloring requirements of the user, for example, two spheres with color attributes are created as the reference $B_1$ 106 and the reference $B_2$ 108. A coloring weight of a color of the reference $B_1$ to the pixel 104 and a coloring weight of a color of the reference $B_1$ to the pixel 104 are determined in a certain way by using positions of the reference $B_1$ 106 and the reference $B_2$ 108 and a position of the pixel 104. The color of the reference $B_1$ and the color of the reference $B_2$ are used as variable values, the coloring weight of the color of the reference $B_1$ to the pixel 104 and the coloring weight of the color of the reference $B_2$ to the pixel 104 are used as weights, and weighted summation is performed on the color of the reference $B_1$ and the color of the reference $B_2$. A result of the above weighted summation is used as a color of the pixel 104, to color the pixel 104.

It can be understood that the number of references created is not limited to 2, and the shape of the reference is not limited to being spherical, either.

It can be understood that the above method for coloring a pixel in a three-dimensional virtual space can be repeatedly used to color pixels other than the pixel 104 on the model 102, so as to color some or all of the pixels on the model 102, and the above method for coloring a pixel in a three-dimensional virtual space can be further repeatedly used to adjust positions and colors of some or all of the references according to coloring requirements of the user, so as to adjust the coloring effect of the pixels on the model.

In the present invention, a principle of gradient color in a three-dimensional virtual space can be easily simulated by creating a reference, and the gradient color can be intuitively and visually presented on the modeled object, or the coloring of the pixels in the three-dimensional virtual space can be adjusted by adjusting a position and a color of the reference, and can be conveniently, intuitively and visually adjusted on the basis of the existing coloring result.

According to some embodiments of the present application, the method further includes the following steps:

Determine a coloring weight of a color of the nth reference to the colored pixel:

$$\left(1 - \frac{L_n}{\sum_{k=1}^{N} L_k}\right) \frac{1}{N-1},$$

where N represents the number of references, and $L_n$ represents a distance between the nth reference and the colored pixel.

Figure 3:
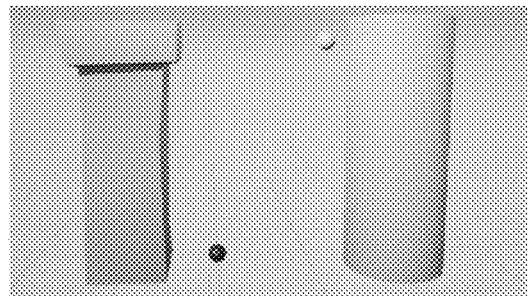
FIGS. 3-8 are diagrams of some examples of coloring presentations according to embodiments of the present invention.
Figure 4:
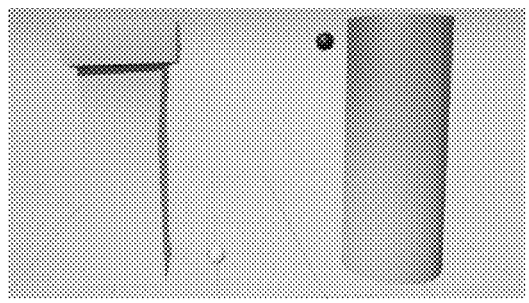
Figure 5:
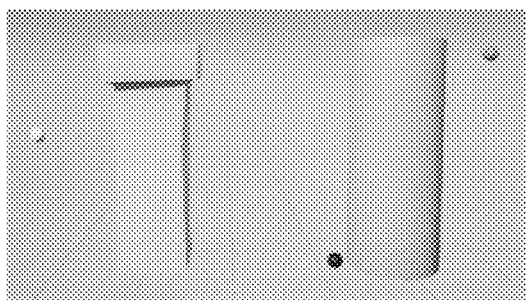

For example, for two three-dimensional virtual models, FIG. 3 shows an example of coloring presentation after the coloring weight of the color of the reference to the colored pixel point is determined by using the above method and the method for coloring the pixel in the three-dimensional virtual space is implemented, where the number of references created is 2. FIG. 4 shows an example of coloring presentation after the method for coloring the pixel in the three-dimensional virtual space is repeatedly implemented to adjust the position and color of the reference so as to adjust the coloring effect. FIG. 5 shows an example of coloring presentation after the number of the references is expanded to 3.

The meaning of this determining of the coloring weight is that the color closer to the pixel has a higher proportion in the final coloring. The above method is applied to multiple pixels on the virtual model. Because the final coloring is a mixture of multiple colors, the presentation is very close to the superposition effect of multiple light sources in the space, and is closer to the color presentation in real life.

According to some embodiments of the present application, the number of references is 2, and the coloring weights of the colors of the two references to the colored pixel are determined based on a position of a projection of the colored pixel on a straight line where the two references are located. If the projection is on a line segment using two references as ending points, a coloring weight of a color of any one of the references to the colored pixel is determined to be: a quotient obtained by dividing a distance from the projection to the reference by a distance between the two references. If the projection is outside the line segment using the two references as ending points, a position of the reference closest to the projection is regarded as the position of the projection, and a coloring weight of a color of any one of the references to the colored pixel is determined to be: a quotient obtained by dividing a distance from the projection to the reference by a distance between the two references. The above method is applied to multiple pixels on the virtual model.

Figure 6:
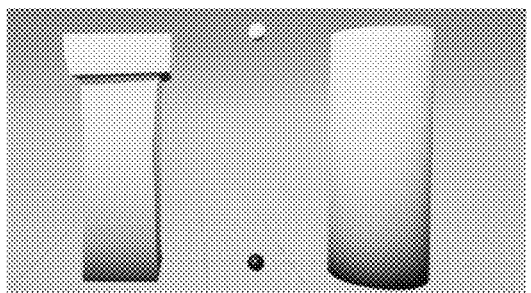
Figure 7:
Figure 8:
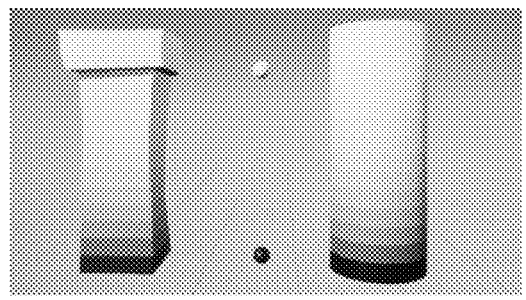

For example, for two three-dimensional virtual models, FIG. 6 shows an example of coloring presentation after the coloring weight of a color of the reference to the colored pixel is determined by using the above method and the method for coloring the pixel in the three-dimensional virtual space is implemented. FIG. 7 shows an example of coloring presentation after the method for coloring the pixel in the three-dimensional virtual space is repeatedly implemented, to adjust the position and the color of the reference to adjust the coloring effect. FIG. 8 shows discrete coloring presentation.

The meaning of the determining of the coloring weight is as follows: The distance between the projection point and the ending point is used as the gradient, and linear and smooth transition between the two colors of the references is performed for the final color of the model, so that the starting point and ending point of coloring can be better reflected.

According to some embodiments of the present application, a formula for the weighted summation is $\Sigma_{n=1}^{N} W_n C_n$, where N represents the number of references, $C_n$ represents the color of the nth reference, and $W_n$ represents the coloring weight of $C_n$ for the colored pixel.

Figure 9:
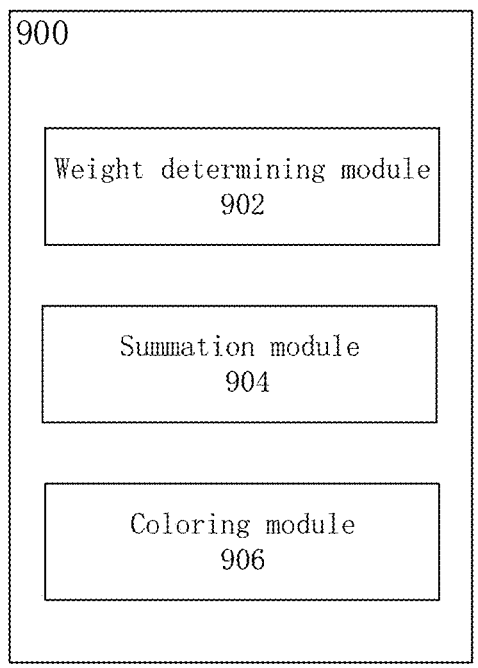
FIG. 9 is a structural diagram of a system for coloring a pixel in a three-dimensional virtual space according to the present invention.

FIG. 9 illustrates a system for coloring a pixel in a three-dimensional virtual space according to an embodiment of the present invention.

As shown in FIG. 9, the system 900 includes a weight determining module 902, a summation module 904, and a coloring module 906.

The weight determining module 902 determines a coloring weight of a color of each reference to the colored pixel based on a position of at least one reference in the three-dimensional virtual space and a position of the colored pixel in the three-dimensional virtual space.

The summation module 904 performs weighted summation on a color of at least one reference by taking the color of at least one reference as a variable value, and based on a coloring weight of the color to the colored pixel.

The coloring module 906 takes a result of the weighted summation as a color of the colored pixel.

The first implementation is a method implementation corresponding to this implementation, and this implementation can be implemented in cooperation with the first implementation. The relevant technical details mentioned in the first implementation are still valid in this implementation. In order to reduce repetition, details are not repeated herein. Correspondingly, the related technical details mentioned in this implementation can also be applied to the first implementation.

According to some embodiments of the present application, a device for coloring a pixel in a three-dimensional virtual space is disclosed, the device includes a memory storing a computer-executable instruction and a processor, and the processor is configured to execute the instruction to implement the method for coloring a pixel in a three-dimensional virtual space.

The first implementation is a method implementation corresponding to this implementation, and this implementation can be implemented in cooperation with the first implementation. The relevant technical details mentioned in the first implementation are still valid in this implementation. In order to reduce repetition, details are not repeated herein. Correspondingly, the related technical details mentioned in this implementation can also be applied to the first implementation.

According to some embodiments of the present application, a computer storage medium encoded with a computer program is disclosed, the computer program includes instructions, and the instructions are executed by one or more computers to implement a method for coloring a pixel in a three-dimensional virtual space.

The first implementation is a method implementation corresponding to this implementation, and this implementation can be implemented in cooperation with the first implementation. The relevant technical details mentioned in the first implementation are still valid in this implementation. In order to reduce repetition, details are not repeated herein. Correspondingly, the related technical details mentioned in this implementation can also be applied to the first implementation.

In some cases, the disclosed embodiments may be implemented in hardware, firmware, software, or any combination thereof. The disclosed embodiments may further be implemented in the form of instructions or programs carried or stored on one or more transitory or non-transitory machine-readable (for example, computer-readable) storage media, and the instructions and programs may be read and executed by one or more processors. When the instructions or programs are executed by a machine, the machine can perform the various methods described above. For example, the instructions may be distributed over a network or another computer-readable medium. Therefore, the machine-readable medium may include, but is not limited to, any mechanism for storing or transmitting information in a machine (for example, computer)-readable form, such as a floppy disk, an optical disk, a compact disc read-only memory (CD-ROM), a magneto-optical disk, a read only memory (ROM), a random access memory (RAM), an erasable programmable read only memory (EPROM), an electronically erasable programmable read only memory (EEPROM), a magnetic or optical card, or a flash memory or a tangible machine-readable memory that transmits network information through electrical signals, optical signals, acoustic signals, or other forms of signals (for example, carrier waves, infrared signals, and digital signals). Therefore, the machine-readable medium includes any form of machine-readable medium suitable for storage or transmission of electronic instructions or machine (for example, computer)-readable information.

The embodiments of the present application are described in detail above with reference to the accompanying drawings, but the application of the technical solutions of the present application is not limited to the various applications mentioned in the embodiments of the present patent, and various structures and modifications can be easily implemented by referring to the technical solutions of the present application, to achieve the various beneficial effects mentioned herein. Within the scope of knowledge possessed by a person of ordinary skill in the art, various changes made without departing from the purpose of the present application shall all belong to the scope of the patent of the present application.

What is claimed is:

1. A method for coloring a pixel in a three-dimensional virtual space, using a color of a reference to color a target pixel, wherein the method comprises:
    determining a coloring weight of a color computed based on a distance of each reference to the target pixel based on a position of at least one reference in the three-dimensional virtual space and a position of the target pixel in the three-dimensional virtual space;
    performing a weighted summation of a color of at least one reference by taking the color of at least on reference as a variable value, and based on a coloring weight of the at least one reference computed based on at least one distance of the at least one reference to the target pixel;
    determining a coloring weight of a color of an $n^{th}$ reference with respect to the target pixel:

$$\left(1 - \frac{L_n}{\sum_{k=1}^{N} L_k}\right) \frac{1}{N-1},$$

wherein N represents a number of the references, and $L_n$ represents a distance between the $n^{th}$ reference and the target pixel; and
    taking a result of the weighted summation as a color of the target pixel.

2. The method according to claim 1, wherein the number of references is 2, and the method further comprises: determining coloring weights of colors computed based on a distance of each of the two references to the target pixel based on a position of a projection of the target pixel on a straight line where the two references are located.

3. The method according to claim 2, further comprising: if the projection is on a line segment using the two references as ending points, determining a coloring weight of a color computed based on a distance of any one of the references to the target pixel to be: a quotient obtained by dividing a distance from the projection to the reference by a distance between the two references.

4. The method according to claim 2, wherein if the projection is outside a line segment using the two references as ending points, a position of the reference closest to the projection is regarded as the position of the reference, and a coloring weight of a color computed based on a distance to any one of the references to the target pixel is determined to be: a quotient obtained by dividing a distance from the projection to the reference closest to the projection by a distance between the two references.

5. The method according to claim 1, wherein a formula of the weighted summation is $\Sigma_{n=1}^{N} W_n C_n$, wherein N represents the number of references, $C_n$ represents the color of the $n^{th}$ reference, and $W_n$ represents a coloring weight computed based on a distance of the $n^{th}$ reference to the target pixel.

6. A device for coloring a pixel in a three-dimensional virtual space, wherein the device comprises a memory storing computer-executable instructions and a processor, and the processor is configured to execute the instructions to implement the method for coloring a pixel in a three-dimensional virtual space according to claim 1.

7. A non-transitory computer storage medium encoded with a computer program, wherein the computer program comprises instructions, and the instructions are executed by one or more computers to implement the method for coloring a pixel in a three-dimensional virtual space according to claim 1.

8. A system for coloring a pixel in a three-dimensional virtual space, wherein the system comprises:
    a weight determining module, configured to:
        determine a coloring weight of a color computed based on a distance of each reference to a target pixel based on a position of at least one reference in the three-dimensional virtual space and a position of the target pixel in the three-dimensional virtual space; and
        determine a coloring weight of a color of an $n^{th}$ reference with respect to the target pixel:

$$\left(1 - \frac{L_n}{\sum_{k=1}^{N} L_k}\right) \frac{1}{N-1},$$

wherein N represents a number of the references, and $L_n$ represents a distance between the $n^{th}$ reference and the colored target pixel;
    a summation module, configured to perform weighted summation on a color of at least one reference by taking the color of the at least one reference as a variable value, and based on a coloring weight of the color computed based on a distance to the target pixel; and
    a coloring module, configured to take a result of the weighted summation as a color of the target pixel.

* * * * *